United States Patent
Curley et al.

(10) Patent No.: US 10,722,801 B1
(45) Date of Patent: Jul. 28, 2020

(54) SESSION MANAGEMENT FOR VIRTUAL ENVIRONMENTS

(71) Applicant: Amazon Technologies, Inc., Reno, NV (US)

(72) Inventors: Jeff Curley, Laguna Niguel, CA (US); Bruce Erwin Brown, Seattle, WA (US); Ross Alan Cameron Gardner, Irvine, CA (US); Brian J. Schuster, Burien, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 41 days.

(21) Appl. No.: 16/058,740

(22) Filed: Aug. 8, 2018

(51) Int. Cl.
*A63F 13/00* (2014.01)
*A63F 13/798* (2014.01)
*A63F 13/843* (2014.01)

(52) U.S. Cl.
CPC .......... *A63F 13/798* (2014.09); *A63F 13/843* (2014.09)

(58) Field of Classification Search
CPC ...... A63F 13/12; A63F 13/537; A63F 13/795; A63F 13/35; A63F 2300/556; A63F 2300/5566; A63F 2300/5586
USPC .......................................................... 463/29
See application file for complete search history.

(56) References Cited

U.S. PATENT DOCUMENTS

| | | | | |
|---|---|---|---|---|
| 8,425,330 B1* | 4/2013 | Kislyi | ..................... | A63F 13/12 463/32 |
| 8,727,892 B1* | 5/2014 | Chun | .................. | G07F 17/3276 463/25 |
| 10,398,985 B2* | 9/2019 | Shaw | ..................... | A63F 13/12 |
| 2010/0029386 A1* | 2/2010 | Pitsch | ..................... | A63F 13/12 463/35 |
| 2012/0309539 A1* | 12/2012 | Smith | ................... | A63F 13/795 463/42 |
| 2012/0311036 A1* | 12/2012 | Huhn | ..................... | G06Q 10/10 709/204 |
| 2013/0123021 A1* | 5/2013 | Stubb | .................. | G07F 17/3227 463/42 |
| 2013/0296036 A1* | 11/2013 | Scott | ...................... | G07F 17/32 463/26 |

* cited by examiner

*Primary Examiner* — Michael A Cuff
(74) *Attorney, Agent, or Firm* — Hogan Lovells US LLP

(57) ABSTRACT

A quick or limited matching process can be used to quickly get players of a gaming application into an active game session. In order to improve the quality of the match for a subsequent game session, a longer-running match process can be utilized while players are engaged in a current game session. A pool of players likely to be available around the time at which a current game session will end is determined. The longer-running match process can analyze the data for the player pool to determine matches of players for one or more future game sessions. Information for these sessions can be provided to the relevant players, who are then enabled to join in the respective sessions. Such a process provides for more flexibility and accuracy in the matching process without extending the player wait times endured.

20 Claims, 8 Drawing Sheets

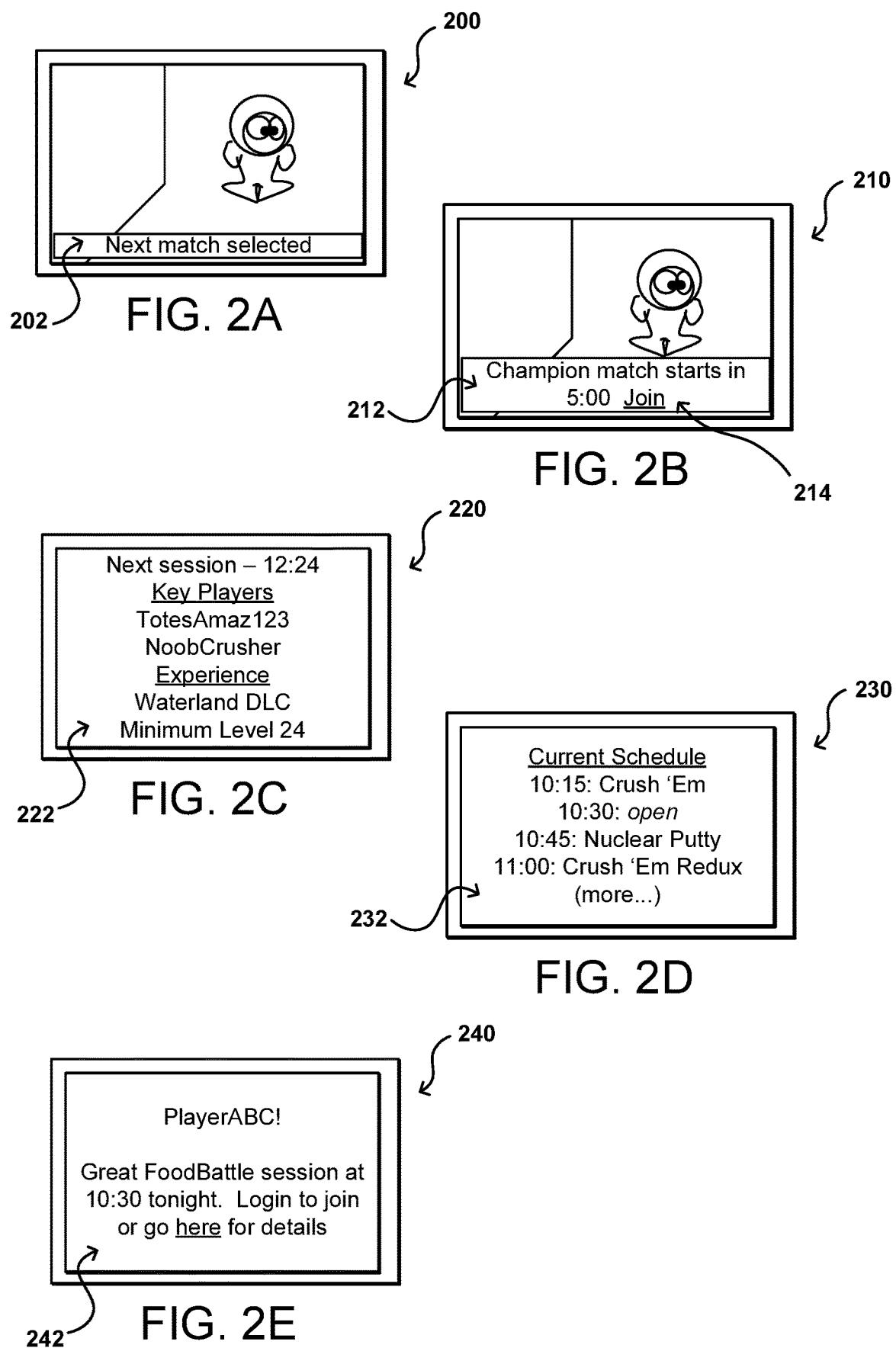

SESSION MANAGEMENT FOR VIRTUAL ENVIRONMENTS

BACKGROUND

The widespread adoption of a variety of computing devices has resulted in a corresponding increase in the variety of applications available to users. For gaming applications, many of these games enable users to engage in online multiplayer games, which may be hosted by a central gaming server. For game environments with a large number of players, the players may be divided into matches or sessions that each includes a subset of the current players, such as where a maximum number of allowable players in a session is less than the number of current players of the gaming application. In order to provide for a better player experience, attempts can be made to match certain types of players for a session based on factors such as skill level or requested game difficulty. For large numbers of players, it can be time consuming to attempt to locate players for a session that satisfy the appropriate criteria to be placed together in a single session. Further, there may not be a sufficient number of players available at a specific time that satisfies those criteria. In either of these situations a player may have to wait for an extended period of time until an appropriate game session can be located, which may cause the player to quit the game or switch to another gaming application.

BRIEF DESCRIPTION OF THE DRAWINGS

Various embodiments in accordance with the present disclosure will be described with reference to the drawings, in which:

FIGS. 2A, 2B, 2C, 2D and 2E illustrate types of match or session information that can be provided to players in accordance with various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the management of users participating in electronic or virtual sessions. In particular, various approaches provide for the matching of players into sessions of a gaming application. Matching of a large number of players with a wide variety of attributes can be a complex and time-consuming process, which may result in wait times that are undesirable to players wanting to join in a gaming session. Accordingly, a quick matching process can be used to quickly get a player into an active game session. In order to improve the quality of the match for a subsequent game session, the data can be analyzed using a longer-running match process while the player is engaged in a current game session, for example. This can include additional player or game data, as may relate to the state of the current and previous game sessions. A time at which the player will be done with the current session can be determined, as well as a pool of other players likely to be available around that time. The longer-running match process can analyze the data for the player pool to determine matches of players for one or more future game sessions. Once determined, this information can be provided to the relevant players and those players enabled to join in the determined sessions, providing for more flexibility and accuracy in the matching process without extending the wait times endured by the players.

Various other functions can be implemented within the various embodiments as well as discussed and suggested elsewhere herein.

Figure 1A:
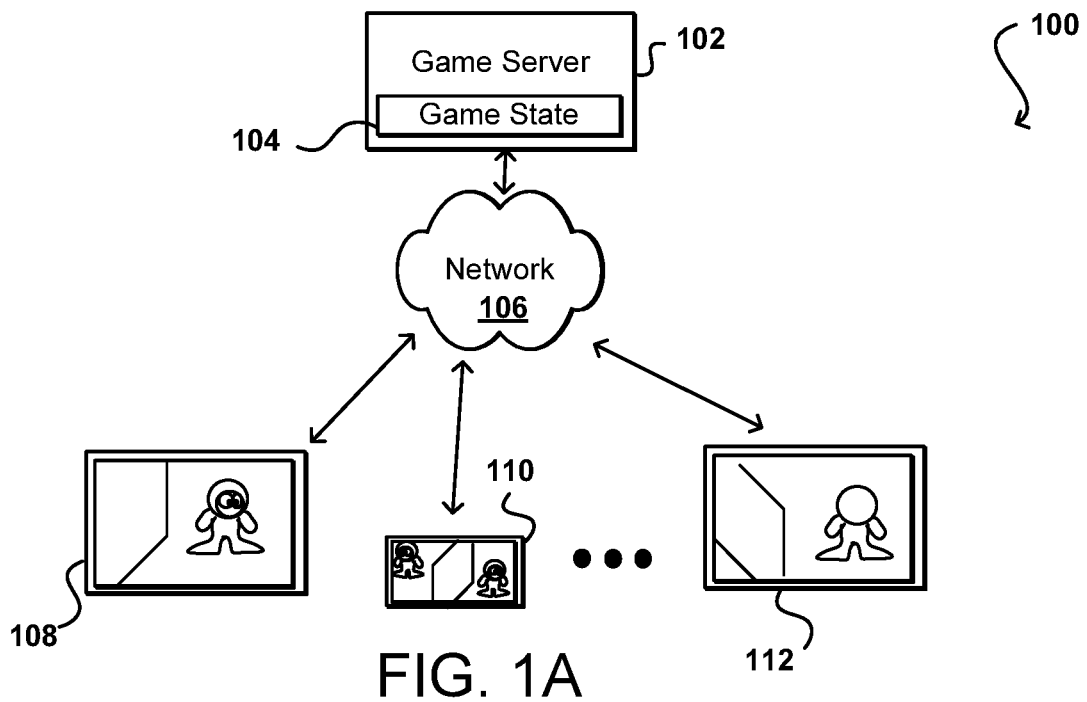
FIGS. 1A, 1B, and 1C illustrate example interactions for players of a multiplayer game that can be provided in accordance with various embodiments.

FIG. 1A illustrates an example multi-player gaming configuration 100 that can be managed in accordance with various embodiments. It should be understood that gaming is only one type of application or environment that can benefit from aspects of the various embodiments discussed and suggested herein. In this example, a gaming session is hosted on at least one game server 102. The game server 102 can be a local gaming machine or a remote server operated by a game provider, among other such options. In this example the game offers multiplayer capability, whereby multiple players can utilize respective devices 108, 110, 112 to connect to the game server 102 over at least one network 106, such as the Internet, a local area network, a dedicated gaming network, a peer-to-peer network, or a cellular network, among other such options and combinations thereof. In some embodiments the player devices might first connect to a gaming service, which can cause those devices to connect to a specific game server hosting a specific gaming application, or a session for such an application. Different subsets of player devices may be directed to connect to different game servers each hosting one or more instances of the same, or multiple, gaming applications.

The player devices can join in a session, match, level, instance, or other such occurrence of the game with state data that is managed by a game state component 104 of the game server. In some embodiments one or more game servers 102 can execute the game, while in other embodiments the servers can manage game state for instances of the game executing on the various player devices 108, 110, 112, among other such options. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 102 periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances, a first player will submit a request to join a session of a specified gaming application supported by the game server 102. If there is an existing game session for which the player qualifies, such as by having an appropriate skill level or qualification, then the player may be able to be added to the existing game session. If there is no existing game session for which the player qualifies, or if games can only be joined before the session starts, then the request can trigger the initiation of a new session for the game. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In many situations, the player devices will be at different geographical locations. In order to ensure that all the game state information utilized by the player devices is accurate, player input in many cases will be transmitted from the individual player devices to the relevant game server 102, such that the game state can be updated by the game state manager 104, and the updated game state information can be propagated to the various player devices such that the devices are all utilizing consistent game state information. The game state information can include, for example, position and orientation information for the players and objects in the game, as well as gameplay data for actions being performed in the game environment by any of the players or other gameplay elements. Such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball or shooting a paint gun, a first player might direct the action towards a last known location received for a target player. The action will be likely to miss, as the other player may have moved since the last received location such that the first player may see the action take place but the action will actually fail because when the game state data is synchronized the target player will actually not have been in that location. The game server then might have to retract the apparently completed action, or wait to determine whether the action is successful, either of which can significantly degrade the gaming experience.

It can therefore in at least some embodiments attempt to match players together in a session based at least in part upon geographic location and/or latency concerns. For example, players with fast connections might be desirable to match together in a session so none of the players is slowing down the session, while players with slower connections might be matched together to prevent an unfair advantage to a player with a faster connection.

It can be desirable to match players for a session according to a variety of other types of matching criteria or matching rules as well. For example, it may be desirable to match players together that have a similar skill or experience level, in order to prevent inexperienced players from being dominated by more experienced players, as well as to ensure that experienced players feel challenged or otherwise are able to enjoy the experience. It may also be desirable to match players based on the types of games they like, past experiences, social connection status, and the like. There may also be other reasons for matching players in a session that may be at least somewhat unrelated to similarities but based on other factors. For example, if a certain player has lost in several game sessions then it might be desirable to match that player with others that will likely improve the player's chance of winning, in order to improve the player's experience and increase the likelihood that the player will keep playing the relevant game. Similarly, if a player has won a number of matches in a row then it might be desirable to match that player into a more difficult session so that the player will be matched more evenly with the other players in that session. There may be other factors as well, such as available content, player character skills or characteristics, player inventory, available maps or skills, and the like.

Figure 1B:
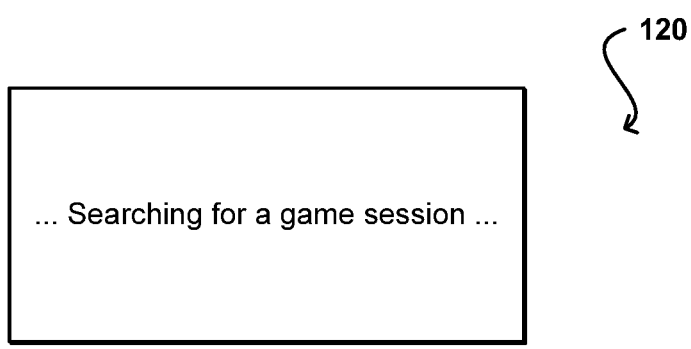
Figure 1C:
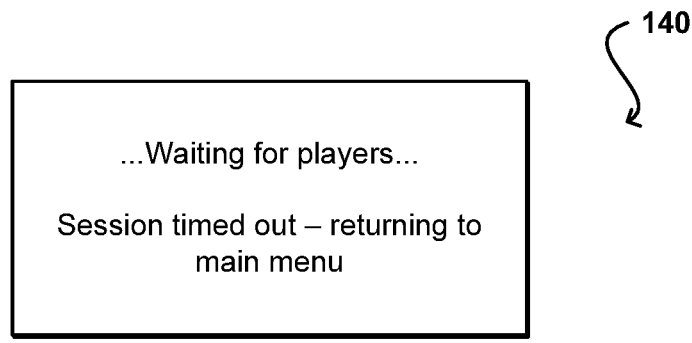

Due at least in part to the large number of factors that may be considered when matching, as well as the time it takes to analyze a large number of players in a matching process, the matching process itself can take a significant amount of time. The problem may be exacerbated based on the number of active sessions, and the length of those sessions, relative to the number of available players, as only a small subset of the players may be available to join a new session at any time. If the matching process waits until a player finishes a current game, match, or session, for example, then it may be a while until a sufficient number of players can be identified who have the appropriate matching characteristics to be placed into a gaming session with that player. This may result in the user getting one of a number of different screens or messages displayed for a period of time while waiting for the session. For example, the notification 120 in FIG. 1B indicates that the game server or manager is searching for a game session that is a match for the player, which may involve attempting to locate players satisfying a matching criterion who can be placed in a new session with the current player. This screen may be displayed until a matching session is located, or players for such a session are located, or until the player abandons the game request. A player might also get a notification 140 such as the one where the game server is waiting for a sufficient number of matching players to become available for a game session, as illustrated in FIG. 1C. As illustrated in this example, however, the wait exceeded a maximum wait period or threshold such that the session or match search has timed out, which can result in the search being canceled and the player being returned to a main menu or other such game screen. As should be apparent, any of these situations can be undesirable and result in a poor player experience. A poor player experience often results in the player playing different games or doing different activities, which also has a negative impact on the publisher of the relevant game, among other related entities.

Accordingly, approaches in accordance with various embodiments can perform matchmaking, or other session participant determinations, for long-running processes that occur sequentially, or at least at different periods, over time. A matchmaking process can access various types of information for the players of a game, or other users of an application or environment, and analyze that information using one or more matchmaking functions or criteria. The types of information can include any appropriate types discussed or suggested herein, as may relate to implicit or explicit player preferences, historical matchmaking trends, and player state information, among other such options. The state information can be updated during or after specific sessions or matches, in order to represent a current level of success or skill, etc. As used herein, a long running process corresponds to a matchmaking process that can be independent of match generation and exists across many matches or sessions of the same game, or different games, applications, or environments.

As mentioned conventional matchmaking for games and similar applications has previously been viewed as an instantaneous operation without the benefit of history or state information. Players who are currently available to join a game session are placed into a matchmaking queue, and match candidates are generated from combinations of players in that queue at a specific point in time. One or more matchmaking rules are applied to determine whether those match candidates, or any combination thereof, are valid. If a sufficient number of match candidates are determined to be valid, or satisfy the appropriate matching rule, then the match or session is created, and any history about what brought those players together is lost.

The use of long-running processes allows matchmaking to account for, and consider, player preferences and historical information to attempt to predict when future matches, and potentially matches with a higher match score, might be available for one or more users. The matchmaking process can scan the entire gaming environment for players with similar preferences or states, for example, and attempt to determine when those players might become available to match. A player might become available at a future time based upon an anticipated ending time of a current match or at a time predicted based on past player behavior, among other such options. Long-running processes can be particularly beneficial for situations where a particular aspect or characteristic is desired for a match. As an example, a particular downloadable content patch might contain an obscure map that a small number of players like to play, and a long running process can recognize when a critical mass of players that want to play that obscure map are likely to be available. A game management service or other such system or component can then notify those players about the pending upcoming availability of a game session utilizing that obscure map.

The use of long-running processes also enables matchmaking to consider historical trends over time to make matchmaking predictions. By analyzing when players of a particular game with a common set of preferences are most likely to be online to match, a long running process could send a notification to a device (e.g., phone or tablet) of a player to notify the player that, based on factors such as the day of the week and the time, players with similar preferences will likely be coming online to play. These notifications can optimize a player's online time by increasing the likelihood of finding better matches and decreasing the wait time to find matches.

The use of long-running processes also enables state information about a player from match to match to be considered in the matchmaking process. For example, if a player has had a streak of consecutive losing matches, the long running process could look for less skilled players with whom to match with the player in future matches, in order to improve retention. Approaches utilizing technologies such as machine learning can attempt to maximize retention by looking at factors such as a win/loss ratio across consecutive matches, among other such options.

In some embodiments, a first approach or process, such as a "quick" process as referred to herein, might be used to quickly locate a game session for a player requesting to join a game session that is similar to conventional approaches in that it utilizes a limited matchmaking approach. For example, a user might load a game into a console or access a game using a computing device, then select an option to join a multi-player game. Various criteria can be specified with such a request, such as a difficulty level, type of game, map, session characteristics, and the like. A game management service receiving the request can contact a matchmaking service, or other such system or component, to attempt to identify currently available players that are able to join in the session, and that satisfy certain matchmaking criteria, such as having submitted similar requests in a recent period of time. The matchmaking service can return a list of players for a session, and the session can be initiated on a game server, for example, and the devices for the selected players caused to communicate game data with the respective game server. Such an approach may be desirable to limit the amount of time that a player has to wait before the player can participate in a game session, as the process can be configured to complete within a matter of seconds, for example, even though the initial match or session may not be optimal based upon various factors or aspects of the respective player.

During the session, however, the matchmaking process can continue, or another matchmaking process can be initiated. This can be a long-running process in at least some embodiments, which will attempt to identify a pool of players to participate in one or more upcoming sessions. The long running process can analyze additional types of data, as discussed above, and can have the benefit of being able to take longer to identify strong matches since the players are already engaged in current sessions and in most cases will not be impacted by the longer duration of the matching process. In at least some embodiments, the matchmaking process can keep track of when various players are likely to become available in the future, and can attempt to determine optimal matches for specific times based at least in part upon the predicted availability, as well as the other matchmaking criteria discussed herein. Also as mentioned, the matching function or criteria for a long-running process for future matches can be different than for a short process intended to quickly identify matches for a set of players.

Once a match is located for a player, that player can be notified in a number of different ways. In one embodiment, the player experience may not be any different, in that after a current session the player will see a screen indicating a time until a start of the next session. The player may be unaware that a different process was used to determining the participants in that particular gaming session.

In other embodiments, however, information about the upcoming match can be provided to the player such that the player can make decisions related to that upcoming match. As an example, a game view 200 illustrated in FIG. 2A includes a notification displayed over the active game content, although other types of notifications can be used as well as would be understood to one of ordinary skill in the art in light of the teachings and suggestions contained herein. In this example, a simple notification 202 is displayed to a player indicating that their next match has been determined. This may be advantageous for a number of reasons. Notifying the user of a good subsequent match or session may be more likely to cause the player to stick around for the next session that switch to a different activity, since the player knows in advance that the match may be a good one. Further, such a notification may make it less likely that the player leaves a current match or session even if the player is not particularly enjoying the session, for any of a number of reasons, if the player knows that a better match is up next. Such a notification can also provide more confidence to the player as the player can be made aware that the game manager is attempting to locate the best overall matches, and not just selecting from a group of players available at a particular point in time where there may not be sufficient time available to make a strong match.

The game view 210 of FIG. 2B illustrates another example notification 212 that can be presented to a player in a current match or session. This notification provides information about an upcoming match, and also provides an approximate start time for the match. Such a notification may be beneficial if the upcoming match might be of particular interest to a player, but will require the player to either wait until a specific time or engage in potentially less interesting sessions until that session is ready to begin. Without such information, a player may just enter into less interesting sessions that are available without a wait, or may not wait until that time because it is possible that the match may not be worth the wait. In some embodiments, the player may also have an option 214 to indicate that the player is interested in joining that session. This can help the game system to ensure that there will be a sufficient number of strong matches for the upcoming session, and can also ensure that a player does not end up waiting for a session in which there is a lot of interest such that the player may not be able to join the session.

In some embodiments, a player can receive notifications outside current sessions, or can obtain additional information during a current session. For example, in the display 220 illustrated in FIG. 2C a notification is presented that provides various types of information for an upcoming match. The types of information can vary, but in this example the notification includes the time of the next match or session, as well as information about at least some of the players who have been selected as matches for the session. This can include, for example, players with whom a given player has played previously, or connections through a social or gaming connection, among other such options. Various characteristics of those players may be displayed as well, as may include their skill, win/loss ratio, inventory, character type, avatar view, etc. Information about the session is also provided, herein indicating the map or environment for the session, as well as any minimum, maximum, or required characteristics for the session. Here, the player can see that there are no players in the session with levels below 24. Such information is useful to display to a user, as the user can obtain useful information for a strong upcoming match, and thus may be more likely to continue player. A player may also appreciate receiving such information, as if the player does not feel like participating in the session the player may be able to provide such an indication, such as through selecting a different session, earlier, which can result in more time for a strong replacement player to be determined for that session.

As mentioned, such an approach can be used to identify future matches or sessions that may be of interest to a particular player. This may include multiple sessions at different upcoming times. Accordingly, a proposed schedule 230 can be provided to a player, as illustrated in the view of FIG. 2D. In this example, information for a set of three upcoming matches is displayed, including the approximate times for the matches. For games of specified lengths these may be actual times, while for other games they may be approximate times, etc. As illustrated, there may be gaps in the schedule in some embodiments, where a strong match was unable to be determined. This can be indicated to a player, so the player can decide to engage in a different match or other activity during that time. In some embodiments, a player can also consult the schedule and determine which matches the player wants to join. In some embodiments there may not be a minimum or maximum number of players for a session, players may be able to drop in or drop out, or it is not necessary for all invited players to participate in a session. In such circumstances, the player can consult the schedule and determine which matches or sessions the player wants to join. In some embodiments the player can select sessions of interest and have alarms or notifications set to be provided to the player at, or just prior to, the beginning of the session. For example, a player might select the best four upcoming sessions and then get a notification five minutes before each of those sessions begins, such that the player can stop what they are doing and participate in the game. In some embodiments the schedule may be fixed a certain amount in advance, while in other embodiments the schedule may update continually or as better or new matches become available. Further, in some embodiments the schedule might only display information about strong matches, or certain types of matches, while in other embodiments a schedule might display the strongest available match for each time period, which can be updated over time, so the player can determine the best time(s) to play over an upcoming period of time, such as an upcoming evening, night, or weekend.

In still other embodiments a player might sign up to get notifications of certain types of upcoming matches that are determined using such a long-running process. For example, the view 240 of FIG. 2E illustrates an example notification 242 that can be presented to a user in accordance with various embodiments. The user might subscribe to certain alerts, or ask to be notified of upcoming matches or sessions that might be of particular interest to the user, among other such options. Here, a user might receive a text message, email message, instant message, or other such notification indicating that there is an upcoming session at a specific time. There may be at least some details included in the message to gauge the user's interest, as well as the option to obtain more information if desired. There may be other options as well, such as an option to join the session if the session is about to start, or is in progress, and is accessible from a device currently being utilized by the user. In situations where a player can exit out of a session at any time, a player might select an option to switch to the new session as soon as the session is available. Various other types of notifications can be provided as well within the scope of the various embodiments.

Figure 3:
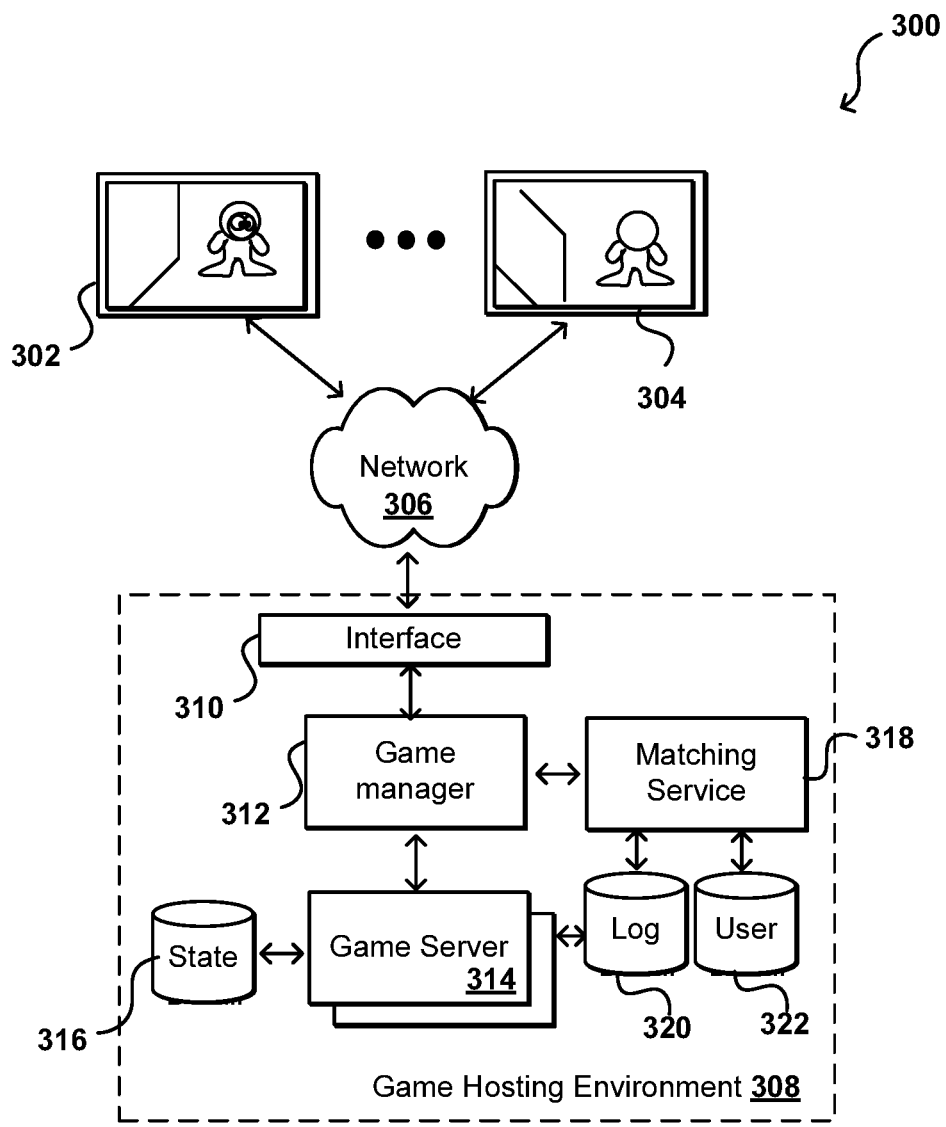
FIG. 3 illustrates an example system for matching players of a gaming application that can be utilized in accordance with various embodiments.

FIG. 3 illustrates an example game management system 300 that can be utilized in accordance with various embodiments. In this example, as discussed previously, various player devices 302, 304 can submit requests across at least one network 306 to a game hosting environment 308, where those requests relate to the ability to join in an upcoming, or ongoing, game session, match, instance, or occurrence hosted by resources of the game hosting environment 308. While a single environment provided by a single entity is used for purposes of explanation, it should be understood that a distributed system or system utilizing various third party services can be utilized as well within the scope of the various embodiments. In such a system, the requests can be received to an interface layer 310, which can analyze the requests to determine the type of request, for example, and can direct the requests, or information for the requests, to a game manager 312 or other such sub-system or service. In this example, the game manager 312 can pass information for the requests to a matching service 318, which can attempt to determine matches among the various players to be placed into game sessions together. Identifying information can be passed to the game manager 312, which can then cause the respective player devices 302, 304 to communicate with a selected game server 314 that will be hosted the session selected for participation of the player device. Once the session is initiated, the player devices 302, 304 can be enabled to send and receive game state data with the respective game server directly, without having to pass through the interface layer 310 or game manager 312, in order to help reduce latency.

As mentioned, matchmaking in such an environment can take a long time to complete, or at least longer than various players may be willing to wait to obtain an optimal match. Accordingly, the matchmaking service 318 in some embodiments can utilize a process, such as a long-running process, that attempts to perform matchmaking for times in the future, even while at least some of those players may be actively engaged in current matches, sessions, or other such activities. As mentioned, conventional matchmaking approaches only look at making a single match for each current player request, and the matchmaking process starts over for each new request received from a given player. Such an approach can take a longer amount of time overall, may result in less optimal matches, and in situations where the game-to-game state data is not utilized of available, can minimize the ways in which matchmaking can be optimized.

As mentioned, the matching service 318 in some embodiments may attempt to make a best effort match for a new player request, in order to quickly enable the player to join a game session that at least matches the minimum session match criteria. It may be understood, however, that for some games or situations the current availability and willingness of a player to participate in a session may be the minimum session match criteria. The matching service might look to information for the request, or stored to a user data repository 322 or other such location, and determine the best choice for a match for that player from the currently (or soon to be) available sessions. This might include, for example, the best match within an upcoming period of time, such as within the next twenty seconds or however long the maximum session wait time is determined to be for a particular game or host. In some embodiments a player can specify a maximum wait time as well. In some embodiments the algorithm may attempt to match a new player (i.e., needing a first match) into an existing game that is known to be close to ending, such as where the losing players quit before the game actually ends, in order to give the match maker time to find a more optimal result, while also providing a back fill of users into the game to give the players who remain in that game a better experience, while also providing the new user a minimum delay to play.

In addition to determining the best match to first provide to that player, the matching service can also attempt to determine one or more matches for that player, and other current or upcoming players, for one or more future points in time. This can include, for example, determining at least a next game session while the player is active in a current session, or determining at least one future session after the current session. In some embodiments this may include determining a schedule of upcoming sessions determined to likely be of interest to the player by the matching service 318. The player can then be placed into some or all of those sessions automatically, or can at least be provided the option or mechanism by which to join any or all of those sessions at the appropriate times. Such an approach can help to incentivize a player to continue playing a specific game or set of games offered by a particular game host or provider. Such an approach may also encourage the player to obtain additional downloadable content (DLC), for example, if the player can be assured that the player will be able to find matches that utilize that DLC, such as a match that uses a new map or allows for use of specific powers or skills, etc. Players purchasing DLC in conventional game environments often have trouble joining matches that utilize the DLC because only a subset of players have that DLC, which can discourage the player from obtaining other DLC, which reduces the enjoyment for the player and lessens the purchases of the DLC for the game publisher.

To determine matches for future times, a matching service can utilize a matchmaking function, criteria, or set of rules that considers various types of game and player information, which might take a longer time to process than would otherwise be desirable during a waiting period for a group of players. As an example, such an approach can attempt to determine which players are likely to be available to join in a session at a specific time. The matching service can then analyze players in this "pool" of potentially available players, to attempt to determine strong matches amongst those players. A strong match can be determined in a number of different ways. For example, each pair of players in a pool might be compared to generate a match score, then an optimization function applied to determine the optimal set of matches based on those scores. In another approach, a matching function might look at various factors or criteria and select the matching option that best satisfies all those criteria. The functions or criteria might also weight various factors differently, such that a player's skill level or success rate might be weighted more heavily than the type of inventory or individual skills that that player has. As mentioned, the state data can be updated over time to include success information in a current game session, as well as over a recent string of sessions, to assist with match determinations. As mentioned, this can be used to attempt to even the playing field amongst the various players, such that all players can reasonably enjoy the gaming experience without being dominated by a specific player or being bored by being matches with much less skilled players, etc. Such an approach may also be used to group players together who complement each other, but also break up groups of players that might be too successful when playing together, among other such advantages.

In some embodiments the matchmaking process for a session might stop once sufficient matches have been determined, while in other embodiments the matchmaking process will continue, with recent information being used to update the matches. This may be used particularly in embodiments where the match information has not already been provided to the players, such that they may instead be able to rely upon the fact that they will always be placed into the best match based on the information currently available. If a player wins or loses a current match, for example, that might cause the matching service to place that player into a different session, even though prior to that result a different match had been selected. For obscure matches or criteria it might take several minutes to locate the right matches, which would not be practical to do upon receiving player requests, where anything longer than a fifteen second wait may be considered too long.

In some embodiments the process may also analyze historical game participation data for a user in selecting matches. For example, there may be certain types of games, levels, or matches that a player typically requests or joins, as well as types the player typically avoids. There may also be types of sessions that the player tends to not finish, or states of the session such as where the player is losing badly or is dominating and thus not challenged. These and other factors can be considered as part of the matching criteria. Further, where machine learning or other such approaches are used, this information can be used to determine the likely appeal of a user and predict which possible session is most appropriate for the player based on the learned relationships.

Figure 4:
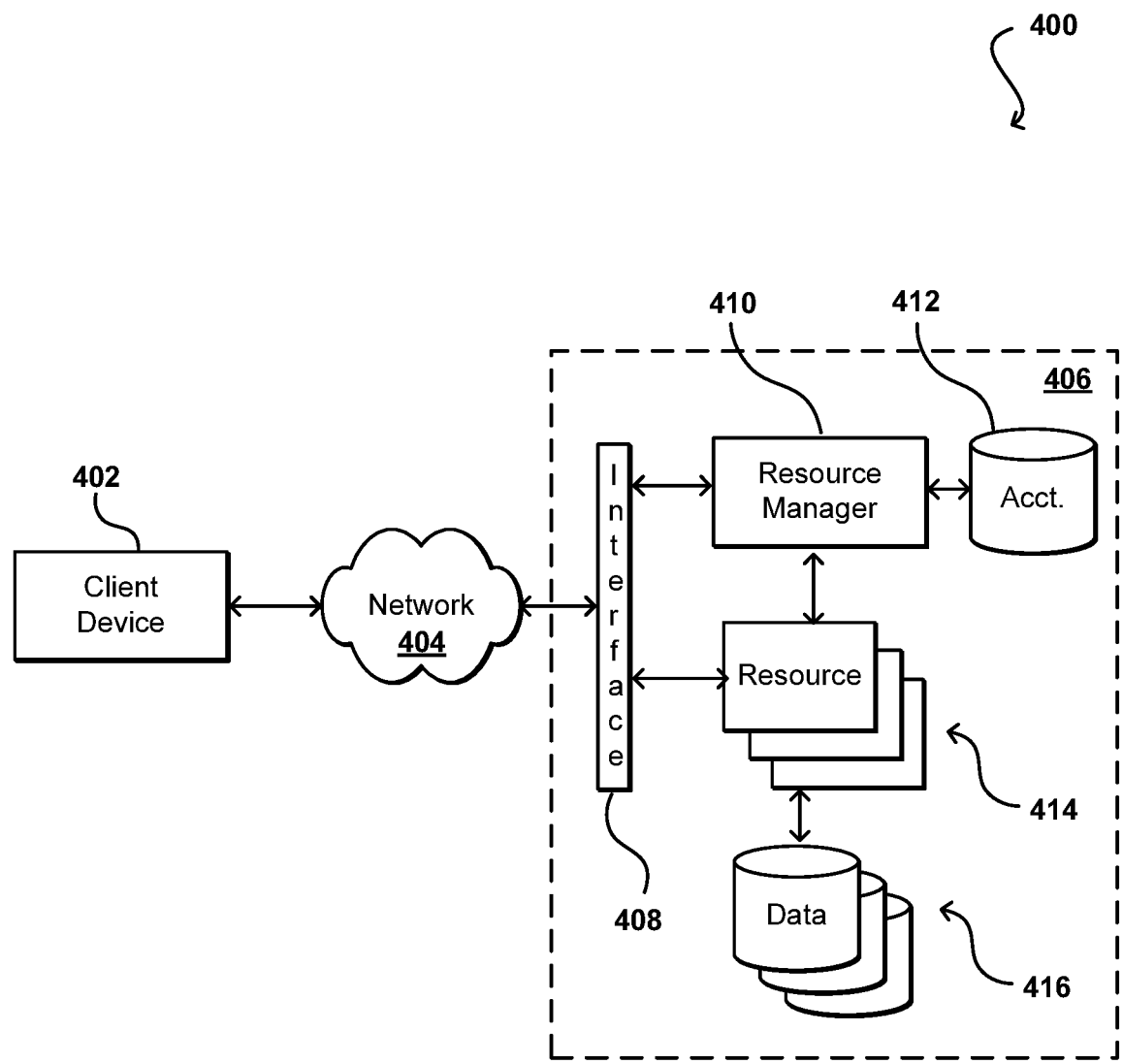
FIG. 4 illustrates an example environment in which various embodiments can be implemented.

FIG. 4 illustrates an example environment 400 in which aspects of the various embodiments can be implemented. In this example a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
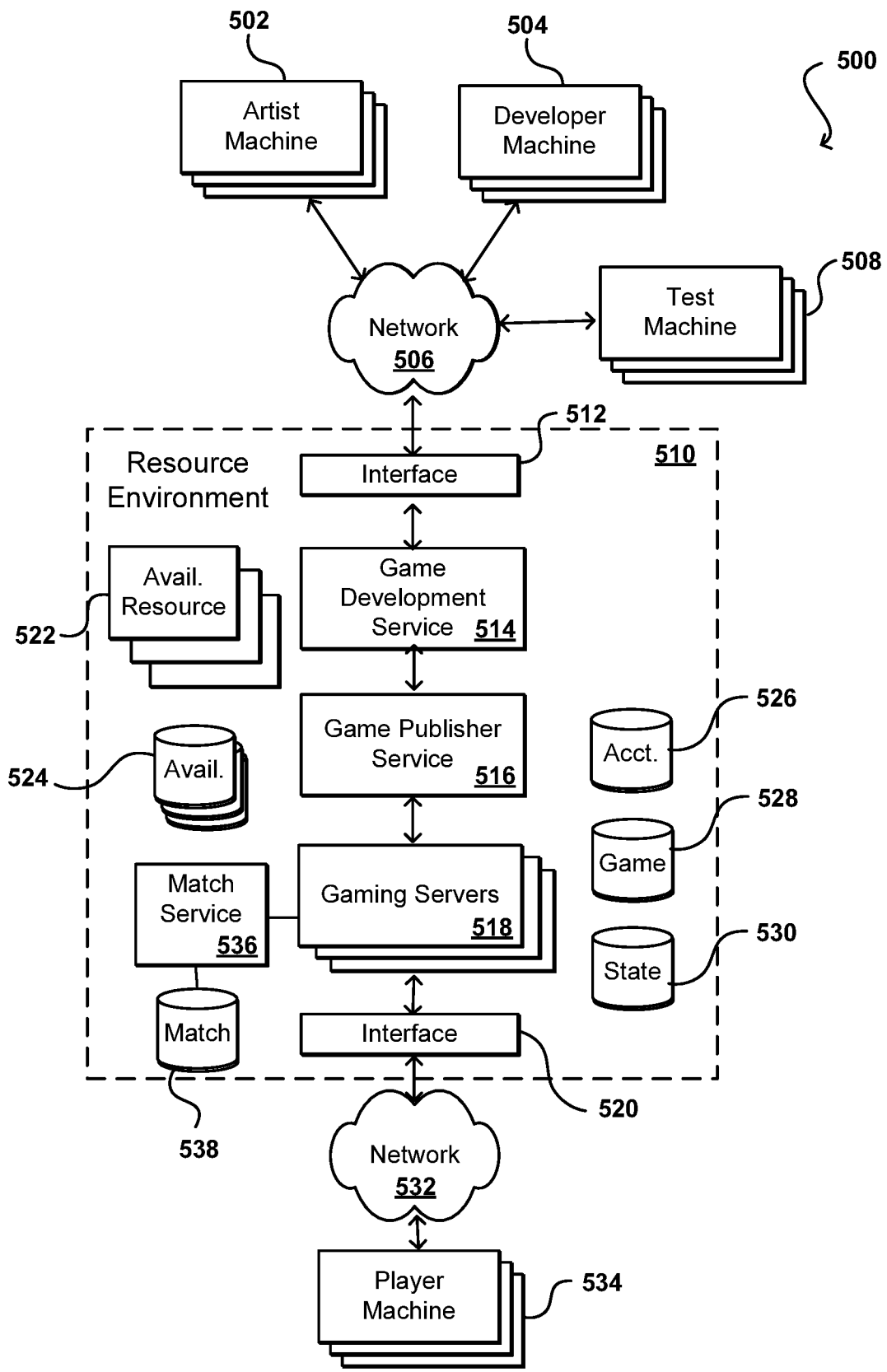
FIG. 5 illustrates an example gaming pipeline that can be used in accordance with various embodiments.

As illustrated in the example system 500 of FIG. 5, at least some of the resources can be used to support platforms and services useful in the development and providing of electronic gaming and three-dimensional graphical content, among other such options. For example, the artist machines 502 and developer machines 504 can collaborate via a game development service 514, which can be provided by a set of resources in the resource environment 510 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 528, where the repositories can include graphics files, code, audio files, and the like. The game development service 514 can also work with an account manager, or at least maintain information in an account data store 526, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 516. The game publisher service 516 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 504 or otherwise. In some embodiments the game content might be published and made available to one or more test machines 508, which may be associated with the customer, such that the customer can test various builds or versions of the game. In some embodiments feedback provided by the test machines 508 may be provided to the game development service 514, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 518 which can run the game and enable player machines 534 to access the game content over one or more networks 532, which may be different from the network(s) 505 used for game development. This can include, for example, dedicated gaming networks, the Internet, cellular networks, and the like. The player machines 534 can communicate with the appropriate interfaces of an interface layer 520 to obtain the gaming content. In some embodiments the player machines 532 will download the gaming content for execution on the individual machines, and will upload (or otherwise communicate) gaming data, messages, and other information to the gaming servers 518, as well as to other players, social networking sites, or other such recipients. The gaming servers 518 can cause state information for the various instances of the game to be stored to at least one game state repository. This can hold state for the game as a whole or for individual game sessions, among other such options. In some embodiments the game content can be executed by the game servers and streamed in near real time to the player machines 534. In some embodiments there may alternatively be a mix of gaming content executed on the player machines and the gaming servers. Peer to peer connections among the player machines and other communications can be utilized as well in various embodiments.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the game servers 518 can work with one or more input management components 536 that can determine the variance of input packet timing for various player connections. The components can determine the variance and work with one or more physics engines to determine a distribution or range of possible positions for a player-controlled gameplay element, or a position for the element to be displayed per the position, velocity, and smoothing function. The input manager 536 can work with the gaming servers 518 to adjust the hit volumes or other aspects for the player controlled elements based on the timing of packets received from the respective player machines 534. The input manager 536 in some embodiments can compare the timing data against expected or ideal timing data as may be stored for a game in a variance data store 538, or other such location, for purposes of computing the variance for the player with respect to the current gaming session.

Figure 6:
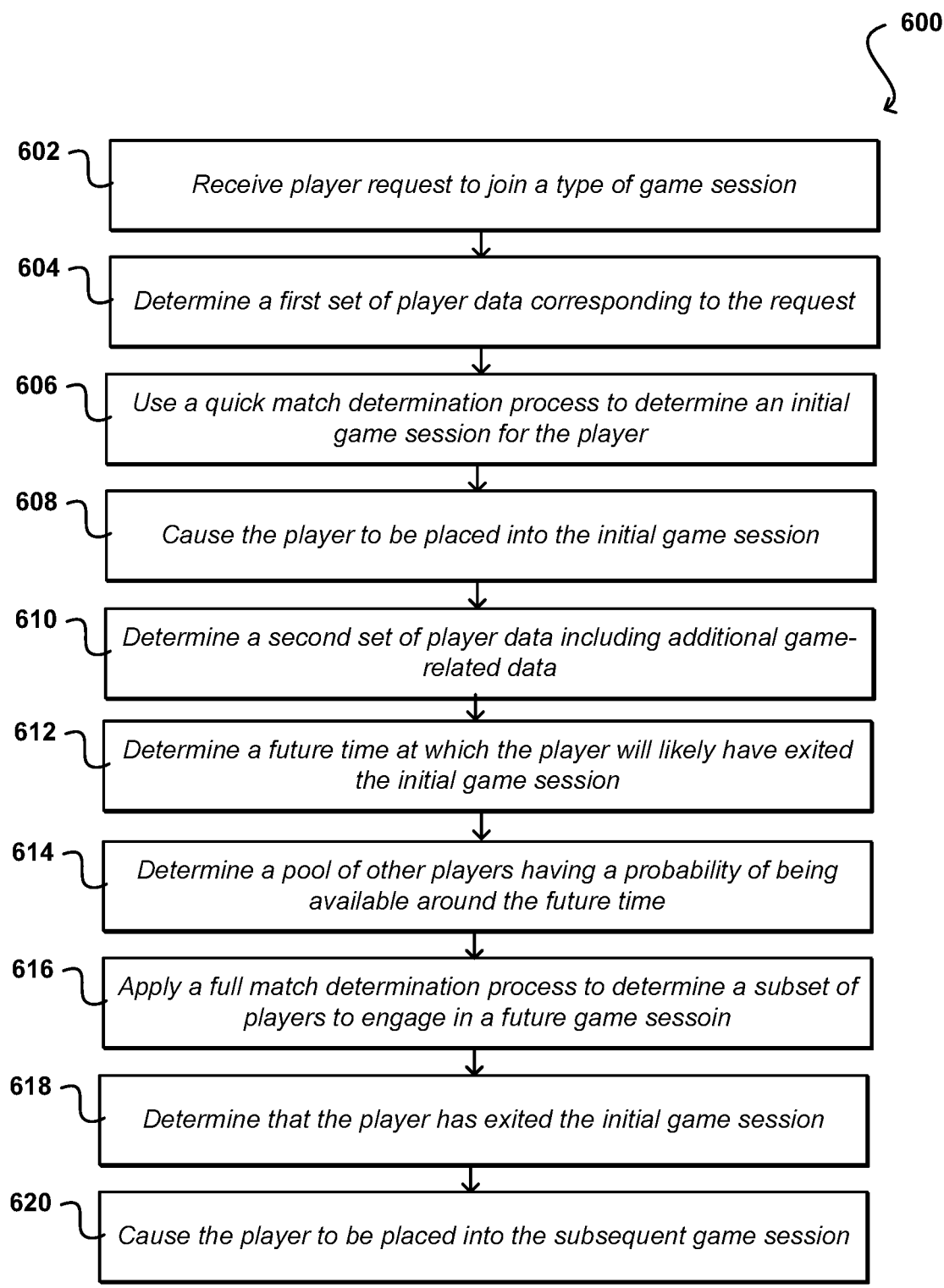
FIG. 6 illustrates an example process for determining a match for a subsequent gaming session that can be utilized in accordance with various embodiments.

FIG. 6 illustrates an example process 600 for selecting players for sessions in a virtual environment, such as a video game, that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, a request to join a type of game session is received 602 for a player, as may be received from a player device the player will use to access the game. The request may specify one or more player criteria for the requested session, such as a type of session, difficulty level, preferred player types, and the like. In order to process the request, a first set of player data can be determined 604 that corresponds to the request. At a very least in some embodiments this can include player identity or profile information that can be used to enable the player to join the session. In other embodiments this can include data that can help to determine an appropriate session, such as may relate to a skill level or experience of the player, a type of player, past session information, and the like. A quick match determination process can be used 606 to determine an initial game session for the player, at least with response to the received request. It should be understood that "quick" in this context is not limited to a particular time or amount of processing per se, but instead is used to refer to a matching process that may look at a limited subset of available data in order to locate an appropriate session within a determined period of time, such that the player does not need to wait an extended period of time before joining a game session. This can include looking at specific data or using a specific set of criteria, rules, or functions in at least some embodiments. Once an initial game session is identified, or created in response to a matching of available players, the player can be caused 608 to be placed into the identified initial game session. As indicated, this may involve sending address information to the player device to communicate with the respective game server, and sending information to the game server about the selected player, among other such options.

As part of the match determination process, a second set of player data can be determined 610 that includes additional game-related data. This can include various types of data as discussed herein, as may include state data for the current or past games, historical performance and preference data, and the like. Information about the current game session and historical player data may be used, along with other relevant information, to determine 612 a future time at which the player will likely have exited the initial game session, whether because the session ended, the player was eliminated, the player chose to leave, or another such exiting action occurred. This may include determining a specific time or a window of time in some embodiments, and in at least some embodiments the time selected can be either the most probably time or the earliest time that satisfies a minimum probability threshold, among other such options. A pool of other players, including the player as well, can be determined 614 which have a determined probability of being available for a game session at around the future time. This can include players in active sessions or players likely to join around that time, among other such options. This may also include players with strong matching characteristics who can be invited to join in the future sessions in some embodiments. A full match determination process can be applied to data for the pool of players to determine a subset of those players to engage in a subsequent game session. As used herein, a full process should be interpreted in view of the quick process above, where the full process can be a longer running process that can consider additional information and attempt to provide more accurate matching than the quick matching process, as the full process will not be bound by a tight time constraint in at least some embodiments and situations. It should be understood that "full" does not require that all available options are utilized, but is intended to differentiate it from a quick or limited matching process used for the initial match determination discussed above. At some point in the future it will be determined 618 that the player has exited the initial game session for any of the reasons discussed or suggested herein. Subsequent to the exiting of the initial game session, the player can be caused 620 to be placed into the subsequent game session with selected players from the pool. As mentioned, such an approach can provide a better match or session for the player than might have been obtained using a quick match process, with a limited time restriction, to determine the matches.

Figure 7:
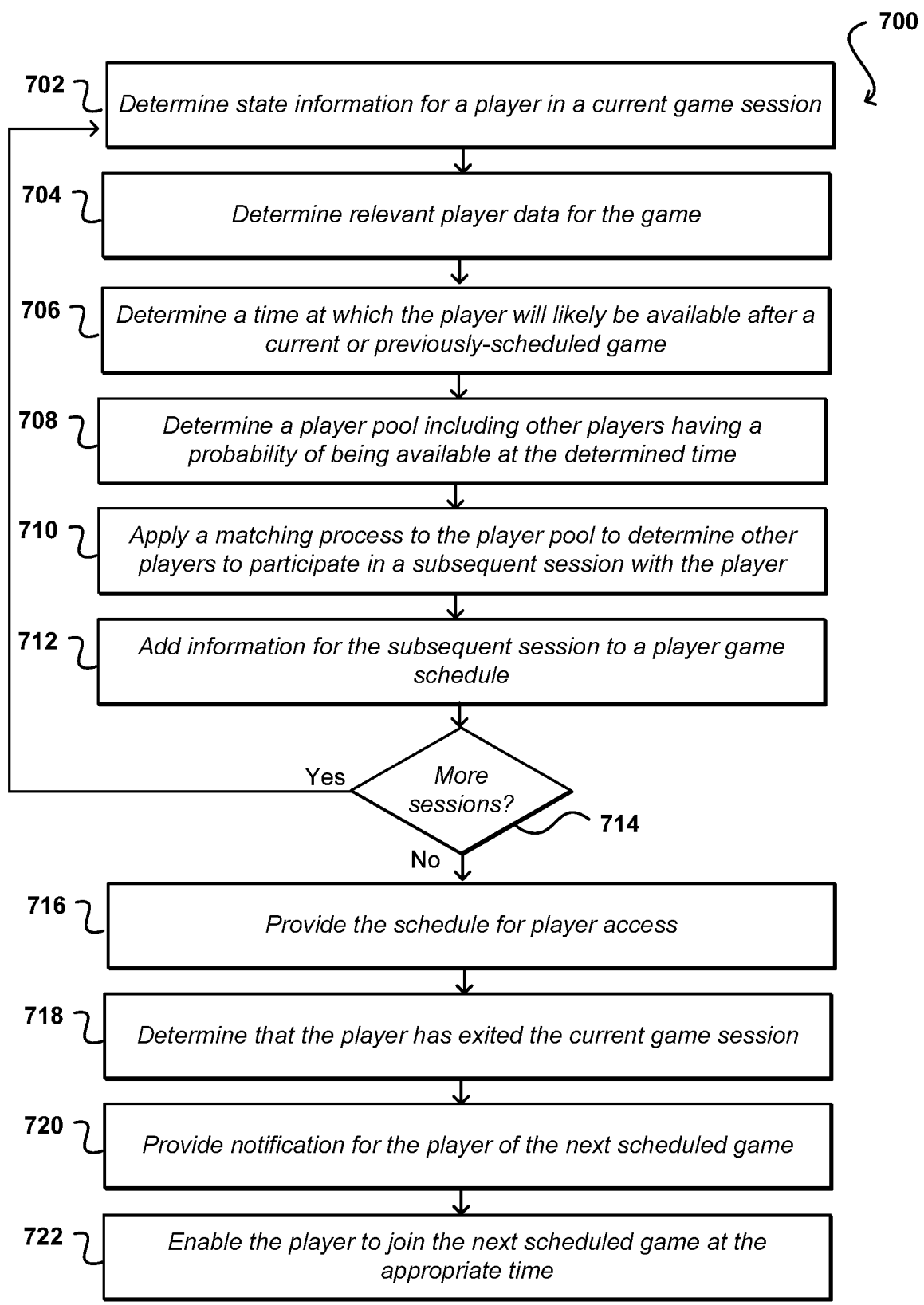
FIG. 7 illustrates an example process for generating a proposed schedule of upcoming gaming sessions that can be utilized accordance with various embodiments.

FIG. 7 illustrates an example process 700 for determining a schedule of upcoming gaming sessions for a player that can be utilized in accordance with various embodiments. In this example, a gaming application is executed for use by one or more players. Other types of applications can be executed as well as discussed elsewhere herein. During execution of the gaming application, state information for that player can be determined 702, such as may relate to the current session, a series of recent sessions, etc. Relevant player data for the game having hosted sessions can be determined 704 as well. As mentioned, the relevant player data may differ between games, as in some games players achieve skills or levels, acquire achievements, or otherwise generate data that can be used to locate players to match into sessions with that player as discussed herein. Based at least in part upon the determined game data, a future time can be determined 706 at which the player will likely be available, which will be after exiting the current game session or another session that was previously scheduled but has not yet completed (or potentially started). A player pool can be determined 708 that includes data for other players having a probability of being available around the determined time. A matching process can be applied 710 to the player pool as discussed herein to determine other players to join the player in a subsequent gaming session, which can be for the same game or type of game session, or other types of games or sessions, etc. Once a subsequent session and at least a minimum number or set of players are determined, for example, information for the subsequent session can be added 712 to a player game schedule. The schedule can be for any appropriate length or period of time, such as for a specific or minimum number of games, length of time (e.g., an hour, evening, or day) or another such period. The process can continue if the game manager or other such service determines 714 that one or more games are to be scheduled, or if there are sessions that can be scheduled with a minimum confidence or other such value, etc.

Once generated and/or updated, the schedule for one or more players can be provided 716 for player access. This can be, for example, provided to only the relevant player or available to at least friends or other connected players, enabling players to join into sessions of interest where possible. The game manager, or another such system or service, can determine 718 that the player has exited the current game session in this example, although exiting is not a requirement in at least some embodiments. A notification can be provided 720 to the player regarding the next scheduled game. As mentioned, in some embodiments such a notification may be provided during a current game session, or even outside any game sessions in which the player is involved. The player can then be enabled 722 to join the next scheduled game at the appropriate time, whether through a manual or automatic joining action. As mentioned, the schedule can be updated periodically or in response to various types of actions, such as whether a player joins or declines a specific game session, has a specific type of win/loss ratio, etc.

In some embodiments a pool of players might be identified in advance of the subsequent session, knowing that it is unlikely that all those players will end up joining. This helps to ensure that a sufficient number of players are available for the session such that the session will be enjoyable and satisfied any minimum session criteria. For some types of games, those selected players may be able to join in the session as they become available. In some embodiments the option may be provided to select multiple possible future games for the next match of a single user in order to facilitate covering the multiple possible outcomes of the current match. For example, a matching algorithm may choose two "next" matches for the player. If the player wins or does well as an individual, or if probability of the player winning or doing well individually is high, then a first of the two next matches can be selected. Otherwise, if the player loses or does not do well individually, the other next match can be selected.

As discussed herein, various matching or selection approaches can be used to match players together into existing or scheduled sessions, or for the generation of new sessions of specific types, etc. In some embodiments there are overall ranking scores that are used to group or match people, while in other embodiments there may be individual pairing scores for players in a pool. In a machine learning environment, the process may take in the data for all players and present groupings of the best matched players for one or more sessions. Game developers can have the option of specifying matching rules or criteria, as well as weighting the relevant importance of those criteria in some embodiments. A developer can also provide various balancing rules or minimum match criteria, such as for situations where there are not enough strongly matched players available for a specific session, so the matching rules or criteria may be relaxed. In some embodiments the process will attempt to find the best matches, but at a minimum will put together players that are available if a minimum or specific number of players are needed for a given session. Similarly, longer wait times may be allowed if there are not a sufficient number of strong matches but it is determined that it is likely that additional matches will become available in the near future. In some cases the player can be notified that an appealing game session will begin at a future time, such as in five minutes, so the player can determine whether the session is worth the wait. The player may also have the option of playing a less interesting session in the meantime in order to pass the time. Various other options can be used as well as discussed and suggested herein.

In some embodiments the scheduling of game sessions also allows for proactive processing or configuration on the part of the game host. For example, if the host knows that there is going to be a large number of players online at a time in the future, the host can ensure that sufficient resources are available. Similarly, the host might take resource capacity into consideration when scheduling games, in order to spread out the load more evenly. For a given session, the host can perform any pre-rendering or pre-processing in order to make the session start more quickly. Various other actions can be taken as well as would be apparent to one of ordinary skill in the art in light of the teachings and suggestions contained herein.

Figure 8:
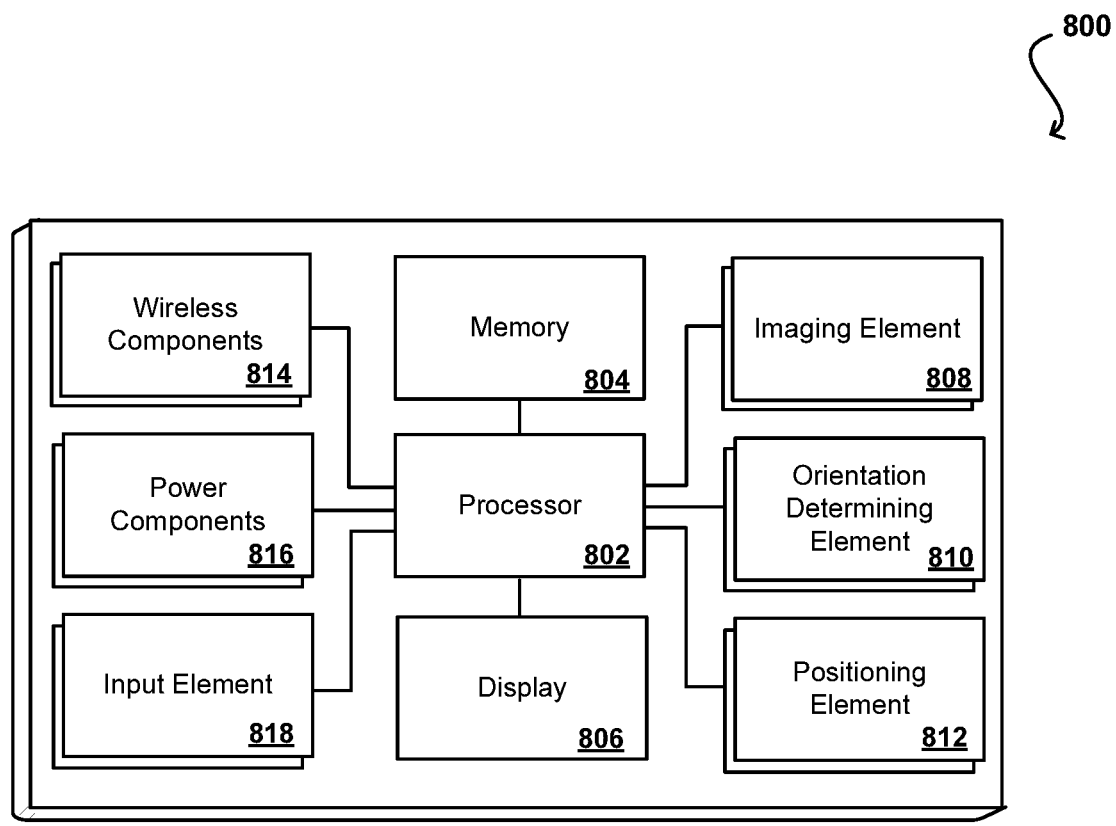
FIG. 8 illustrates example components of a computing device that can be used to implement aspects of the various embodiments.

FIG. 8 illustrates a set of basic components of an electronic computing device 800 that can be utilized to implement aspects of the various embodiments. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    obtaining player data for a first player in a computer gaming environment;
    applying a first matchmaking function to the player data to determine a first gaming session into which to place the first player, a first subset of other players being further placed into the first gaming session according to the matchmaking function;
    applying a second matchmaking function to the player data for the first player to determine a second gaming session into which to place the first player based at least in part on an estimated time at which the first player will exit the first gaming session;
    identifying, during the first gaming session, a pool of the other players having characteristics causing them to be considered for placement into the second gaming session and having at least a minimum probability of being available to participate in the second gaming session;
    selecting, from the pool of other players, a second subset of players for the second gaming session, wherein the second subset is selected based at least in part on historical performance data and historical game participation data of the first player;
    determining the first player has exited the first gaming session; and
    enabling the first player, after exiting the first gaming session, to join in the second gaming session with at least a subset of the second subset of players.

2. The computer-implemented method of claim 1, further comprising:
    using a limited function as the first matchmaking function in order to determine the first gaming session within a maximum matching time period; and
    using the second matchmaking function as part of a long-running process to determine the second gaming session during hosting of the first gaming session.

3. The computer-implemented method of claim 1, further comprising:
    notifying the player of the second gaming session during, or after completion of, the first gaming session.

4. The computer-implemented method of claim 1, further comprising:
    generating, for the player, a schedule of upcoming game sessions selected for the player using the second matchmaking function.

5. The computer-implemented method of claim 1, wherein a subset of characteristics used to determine the first gaming session is different from a subset of characteristics used to determine the second gaming session.

6. A computer-implemented method, comprising:
    placing a first player and a second player into a first gaming session, the first player and the second player being selected for the first gaming session according to a set of matching criteria wherein the matching criteria include at least historical performance data and historical game participation data of the first player;

determining, during the first gaming session, a set of players having at least a minimum probability of being available at a subsequent time for a second gaming session, wherein the determination of the set of players is based at least in part on an estimated time at which the first player will exit the first gaming session;

determining that the first player has exited the first gaming session; and selecting a third player, from the set of players and according to the set of matching criteria, to participate in the second gaming session with the first player.

7. The computer-implemented method of claim 6, further comprising:

selecting the first player to participate in the second gaming session based further upon a performance of the first player in the first gaming session.

8. The computer-implemented method of claim 6, further comprising:

allocating the first player to the set of players; and selecting the third player and the first player for participation in the second gaming session around a time of completion of the first gaming session.

9. The computer-implemented method of claim 6, wherein the set of matching criteria includes at least one of a geographic location, a connection latency, a skill level, a success rate, a player type, a difficulty setting, a player preference setting, a set of inventory items, available map data, or historical player performance data.

10. The computer-implemented method of claim 6, further comprising:

generating a schedule of one or more upcoming game sessions in which the first player has been selected to be eligible to participate.

11. The computer-implemented method of claim 10, further comprising:

performing at least one of resource allocation or preprocessing of a subsequent game session based at least in part upon the generated schedule.

12. The computer-implemented method of claim 6, further comprising:

prompting the first player to join the second gaming session upon completion of the first gaming session.

13. The computer-implemented method of claim 6, further comprising:

notifying the first player of the second gaming session before initiation or termination of the first gaming session.

14. The computer-implemented method of claim 6, further comprising:

notifying the first player of an upcoming game session having a specific aspect only available to a subset of players of a gaming application, the notification identifying at least a time of the upcoming game session and the specific aspect.

15. A system, comprising:

at least one processor; and memory including instructions that, when executed by the at least one processor, cause the system to:

place a first player and a second player into a first gaming session, the first player and the second player being selected for the first gaming session according to a set of matching criteria, wherein the matching criteria include at least historical performance data and historical game participation data of the first player;

during the first gaming session, determine a set of players having at least a minimum probability of being available at a subsequent time for a second gaming session, wherein the determination of the set of players is based at least in part on an estimated time at which the first player will exit the first gaming session;

determine that the first player has exited the first gaming session; and select a third player, from the set of players and according to the set of matching criteria, to participate in the second gaming session with the first player.

16. The system of claim 15, wherein the instructions when executed further cause the system to:

select the first player to participate in the second gaming session based further upon a performance of the first player in the first gaming session.

17. The system of claim 15, wherein the instructions when executed further cause the system to:

allocate the first player to the set of players; and select the third player and the first player for participation in the second gaming session around a time of completion of the first gaming session.

18. The system of claim 15, wherein the set of matching criteria includes at least one of a skill level, a success rate, a player type, a difficulty setting, a player preference setting, or historical player performance data.

19. The system of claim 15, wherein the instructions when executed further cause the system to:

generate a schedule of one or more upcoming game sessions in which the first player has been selected to be eligible to participate.

20. The system of claim 15, wherein the instructions when executed further cause the system to:

prompt the first player to join the second gaming session upon completion of the first gaming session.

* * * * *